United States Patent [19]

Covey et al.

[11] Patent Number: 5,249,212
[45] Date of Patent: Sep. 28, 1993

[54] OBJECT REUSE PROTECTION WITH ERROR CORRECTION

[75] Inventors: Carlin R. Covey, Scottsdale; Hemant K. Gorowara, Tempe, both of Ariz.

[73] Assignee: Motorola, Inc., Schaumburg, Ill.

[21] Appl. No.: 891,126

[22] Filed: Jun. 1, 1992

[51] Int. Cl.⁵ .................................................. G06F 11/10
[52] U.S. Cl. ................................ 371/37.1; 371/37.2; 371/40.1; 371/2.2
[58] Field of Search ....................... 371/2.1, 2.2, 37.1, 371/37.2, 37.7, 49.1, 40.1, 40.2, 40.4

[56] References Cited

U.S. PATENT DOCUMENTS

| | | | |
|---|---|---|---|
| 4,827,508 | 5/1989 | Shear | 380/4 |
| 4,862,462 | 8/1989 | Zulian | 371/37.1 |
| 4,910,736 | 3/1990 | Tanaka et al. | 371/37 |
| 4,926,476 | 5/1990 | Covey | 380/4 |
| 5,050,213 | 9/1991 | Shear | 380/25 |

OTHER PUBLICATIONS

An article entitled "Capability Based Tagged Architectures" by L. Lopriore, IEEE Transactions on Computers, vol. C-33, No. 9, Sep. 1984, pp. 786-803.
An article entitled "Combining Tags with Error Codes" by Richard H. Gumpertz, *Association for Computing Machinery*, 0149-7111/83/0600/0160, 1983, pp. 160-165.
Excerpts from a PhD Dissertation entitled "Error Detection with Memory Tags" by Richard H. Gumpertz, Carnegie-Mellon University, Dec. 1981, excerpts from pp. 38, 39, 40, 51, and 52.
An article entitled "Modern Computer Concepts" by E. J. Laurie, Fellow, IBM Systems Research Institute, The IBS 360 Series, published by South-Western Publishing Co., Burlingame, Calif., copyright 1970, pp. 270-271.
An article entitled "On the Advantages of Tagged Architecture" by E. A. Feustel, IEEE Transactions on Computers, vol. C-22, No. 7, Jul. 1973, pp. 644-656.
An article entitled "Tagged Architecture: How Compelling Are its Advantages?" by E. F. Gehringer and J. Leslie Keedy, IEEE 1985, pp. 162-170.

*Primary Examiner*—Vincent P. Canney
*Attorney, Agent, or Firm*—Jeffrey D. Nehr

[57] ABSTRACT

A method and apparatus for providing error detection, correction and prevention of unauthorized access to data using memory tags. The method and apparatus includes computing an original error detection/correction code associated with a data word. The original error detection/correction code, using a CPU and a subject identification register, is copied to a tag associated with the data word when an original subject writes the data word into a memory. A single-error-correction/double-error detection (SEC/DED) device applies a first bias to the tag to create a first-biased error detection/correction code when the memory is assigned to a first subject. The SEC/DED device applies a second bias to create a twice-biased error detection/correction code when a second subject attempts to access the data word. Access to the data word is denied if the twice-biased error detection/correction code comprises an uncorrectable error.

16 Claims, 3 Drawing Sheets

OBJECT REUSE PROTECTION WITH ERROR CORRECTION

CROSS REFERENCE TO RELATED APPLICATION

This application relates to patent application Ser. No. 07/878,280 entitled "Memory Tagging for Object Reuse Protection," from the same inventive entities, with the same assignee, filed May 4, 1992.

BACKGROUND OF THE INVENTION

This invention relates in general to the field of error correction in a computer, and in particular to error correction in conjunction with object reuse protection in a digital computer.

Error detection and correction coding is designed so that fault-free encoded data satisfies certain mathematical properties. If the encoded data fails to satisfy these properties, one or more bits of the encoded data are in error. If the code incorporates sufficient additional information, it may be possible to identify which bit or bits are in error and require correction. Often hardware is designed to automatically make these corrections as the data is accessed. However, if there are more bits in error than the code can correct, an "uncorrectable error" occurs. Error correction codes are often designed so that they can detect many of these uncorrectable errors so that hardware can abort data access by causing an interrupt or by halting processing. But, if too many bits are in error, an uncorrectable error can masquerade as error-free data or as a correctable error. The probability of such uncorrectable errors is reduced by selecting an encoding that detects the most likely error cases.

Computer security needs very often accompany error detection and correction needs. Patent application Ser. No. 07/878,280 entitled "Memory Tagging for Object Reuse Protection", addressed the problem of prevention of unauthorized access to reused memory. The solution to the object reuse protection problem described in patent application Ser. No. 07/878,280 relies on information stored in additional hardware to provide protection against unauthorized access to data remaining in memory when memory objects are reused.

It would be advantageous to provide an error detection and correction method and apparatus which could be used in mainframe computers, minicomputers, microcomputers, computer workstations and embedded communications equipment in conjunction with the above-referenced object reuse protection method and apparatus. It would be particularly advantageous to provide combined object reuse protection with error-detection and/or error-correction coding using any off-the-shelf CPU. The combination object reuse and data error detection/correction method would be especially desirable in systems that require some measure of fault detection or fault tolerance. It would also be desirable if the object reuse and data error detection/correction method and apparatus would provide combined error detection/correction with object reuse protection for nearly the same cost as providing either of the two features alone.

SUMMARY OF THE INVENTION

Accordingly, it is an advantage of the present invention to provide a method and apparatus for combined error detection/correction and object reuse protection.

It is a further advantage that the error detection/correction and object reuse protection method and apparatus described can be used in a variety of computers and embedded communications equipment. It is yet a further advantage that the error detection/correction and object reuse protection method and apparatus described is an efficient combination of the error detection/correction and object reuse protection functions.

Thus, a method for providing error detection/correction and prevention of unauthorized access to data using memory tags is contemplated which comprises the steps of computing an original error detection/correction code associated with a data word; applying a first forward bias to the code to create a first forward-biased error detection/correction code when the memory is assigned to a first subject; copying the first forward-biased error detection/correction code to a tag associated with the data word when the first subject writes the data word into a memory location; applying a first reverse-bias to the first forward-biased error detection/correction code when the same memory location is read by the first subject; permitting the read access if the first reverse-bias cancels the first reverse-bias yielding the orginal error detection/correction code; applying a second reverse-bias to the first forward-biased error detection/correction code to create a still reverse-biased error detection/correction code when a second subject attempts to access the data word; and denying access to the data word if the still reverse-biased error detection/correction code comprises an uncorrectable error.

In addition, an apparatus for providing combined error detection/correction and object reuse protection is contemplated which comprises a central processing unit (CPU), a memory, a subject identification (ID) register, and a single-error-correction/double-error detection (SEC/DED) device. The memory stores multiple data words, each with a corresponding tag identifying a first process with a first identification (ID). The memory means is coupled to the CPU. The subject ID register stores a current process ID for a current process. The subject ID register is coupled to the CPU and the memory. The SEC/DED device is coupled to the CPU and determines errors in the data word.

The above and other features and advantages of the present invention will be better understood from the following detailed description taken in conjunction with the accompanying drawings.

DETAILED DESCRIPTION OF THE PREFERRED EMBODIMENT

Patent application Ser. No. 07/878,280 entitled "Memory Tagging for Object Reuse Protection", herein incorporated by reference, addressed the problem of prevention of unauthorized access to data remaining in reused memory objects.

The solution to the object reuse protection problem described in the previous disclosure relies on information stored in hardware. The present disclosure combines object reuse protection with a modification to a standard error detection/correction method and apparatus, resulting in a particularly efficient implementation of both functions. By utilizing special coding in tags associated with the storage areas, the same tags can be used for both error correction and object reuse protection.

The system contemplated combines a secure object reuse mechanism with an error-correction mechanism in such a way that both features are provided for essentially the cost of either feature alone. This is possible because there is a certain amount of unused encoding capacity in the error-correction encodings. This extra encoding capacity can be used to represent the identity of the subject that last wrote into each memory word. When a subject writes into a word of memory, the error detection/correction hardware computes a detection/correction code and writes it into a tag associated with the memory word. The system alters this code based upon the writer's identity and reverses the alteration based upon the reader's identity. When a subject attempts to read a particular word, the computer's error detection/correction hardware checks the tag to determine whether an error has occurred. If the reader's subject ID matches the subject ID in use when the word was written, the error detection/correction hardware will detect and correct data errors as usual. But if an object reuse violation is attempted, the invention's alteration to the error detection/correction code causes the error detection/correction hardware to act as if an unrecoverable data error had occurred. In the case of an object reuse violation, the error detection/correction hardware will abort the read operation by interrupting the central processing unit (CPU) of the system.

The error detection/correction method and apparatus are based on information stored as encoded "symbols". The greater the number of possible symbols and the greater the number of symbol positions, the greater the amount of information that can be encoded.

Figure 1:
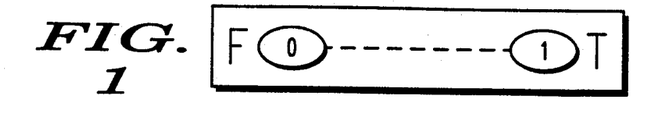
In FIG. 1, there is shown a code symbol illustrating a single bit of information of two values "T" and "F" mapped onto the code signals "1" and "0", separated by Hamming-distance-one.

FIG. 1 depicts a single bit of information whose two values, "T" and "F", are mapped onto the code symbols "1" and "0", respectively. The FIG. 1 encoding yields a "Hamming distance" of one between the two values. A code symbol is said to be Hamming-distance-n from another code symbol if their binary identifiers differ in only n bit positions. The significance of the concept of Hamming distance is that it represents the number of bit errors that must occur for one code symbol to change into another.

Figure 2:
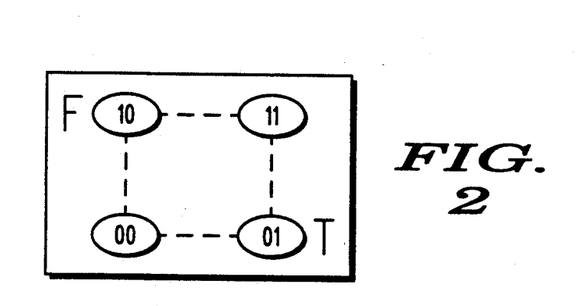
In FIG. 2, two values "T" and "F" are shown mapped into two of the four code signals available in a two-bit code, the values separated by Hamming-distance-two.

In FIG. 2, the two values "T" and "F" have been mapped to two of the four symbols available in a two-bit code. Since two single-bit-errors are required to change a "T" into an "F" (or vice versa), this code has a Hamming distance of two. The code symbols "00" and "11" in FIG. 2 do not represent legitimate information values. Error-free data would always use either the "10" or the "01" symbol. An occurrence of either the "00" or "11" symbol is evidence that a legitimate code symbol has experienced a one-bit error. Although a one-bit error can be detected, the code does not provide sufficient information to permit correction. An attempt to correct a "00" or "11" symbol by changing it to a "01" or a "10" is as likely to produce an incorrect result as a correct result.

Figure 3:
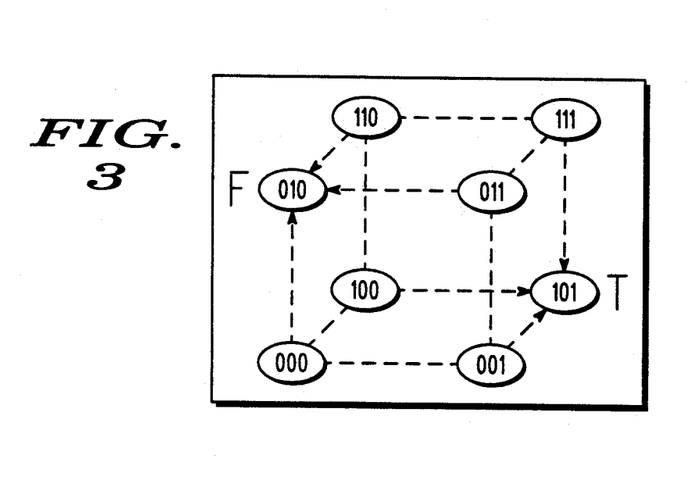
In FIG. 3, two values "T" and "F" are shown mapped into two of the eight code signals available in a three-bit code, the values separated by Hamming-distance-three.
Figure 4:
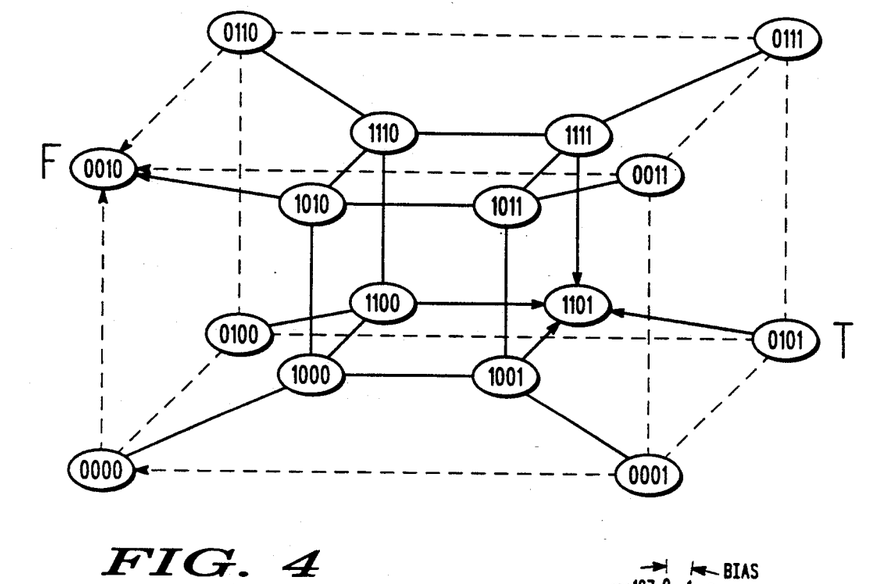
In FIG. 4, two values "T" and "F" are shown mapped into two of the sixteen code signals available in a four-bit code, the values separated by Hamming-distance-four.

To increase the probability of a correct "correction", more Hamming distance is needed between symbols that map to legitimate information values. In FIG. 3, the values "T" and "F" have been mapped to two of the eight symbols available in a 3-bit code in such a way that there is a Hamming distance of three between them. The other six symbols do not represent legitimate information values. Three of these code symbols, i.e. "001", "100", and "111", are Hamming-distance-one from the "T" symbol, but Hamming-distance-two from the "F" symbol. If a one-bit error is considerably more probable than a two-bit error, these three symbols are more likely to represent a "T" than an "F". An occurrence of these symbols can therefore most probably be corrected by changing them to symbol "101", representing "T". But if a two-bit error occurs in a "T" value, the resulting symbol would be Hamming-distance-one from the "F" symbol, leading the correction mechanism to incorrectly "correct" it to "F". FIG. 4 shows a code that prevents this incorrect "correction" by detecting the occurrence of two-bit errors.

In FIG. 4, the values "T" and "F" have been separated by a Hamming distance of four by mapping the values to two of the sixteen symbols available in a 4-bit code space. The remaining fourteen symbols do not represent legitimate information values. Four of these symbols, i.e. "0101", "1001", "1111", and "1100", are Hamming-distance-one from "T" and Hamming-distance-three from "F", so an occurrence of these four symbols is most likely to have resulted from a one-bit error in the "T" symbol. These four symbols can therefore be corrected to "T". Similarly, four of the symbols, i.e., "0110", "0011", "1010", and "0000", are Hamming-distance-one from "F" and Hamming-distance-three from "T", so these can be corrected to "F". Six of the fourteen codes, i.e., "1000", "0100", "0001", "1011", "1110", and "0111", are Hamming-distance-two from both "T" and "F". These six codes indicate that a two-bit error has occurred, but the error cannot be corrected because a "correction" is as likely to be wrong as right.

The code in FIG. 4 is a single-error-correction/double-error-detection (SEC/DED) code. While a typical error-detection/correction mechanism makes no distinction between these six "uncorrectable" symbols, the method and apparatus described in this disclosure takes advantage of this otherwise unused encoding capacity to address the problem of object reuse security.

The method and apparatus for combined error detection/correction and object reuse protection take advantage of the unused encoding capacity of error detection/correction codes. The extra encoding capacity is used to control a process's access to residual data left in a memory area that it has been allocated.

To illustrate the functioning of the system with a representative example, the following discussion assumes that a 32-bit wide random access memory (RAM) is to be provided with single-error-correction/double-error-detection (SEC/DED) capability via a Hamming code. This requires the addition of a seven-bit tag field to each 32-bit memory word. A single-error correction code must be able to pinpoint which single bit is in error, so that it can be inverted to correct the error. The error code must also indicate if there are no errors, so the code must have at least 33 possible values (which can be encoded in six bits). But the six error code bits themselves must also be provided with error-correction, so the code must have at least $33+6=39$ values. The 39 values can still be accommodated within six code bits ($32=2^5<39<2^6=64$). The remaining 25 values ($64-39=25$) are unused for the error correction process, so they could be used for some other purpose such as object reuse security.

Although a six-bit error-correction code can correct a single-bit error in a 32-bit data word, it cannot guarantee the detection of multiple-bit errors. For instance, a two-bit error could change both a data bit and an error code bit, leading to an incorrect "correction". An easy way to provide double-error detection is to add an additional parity bit over the entire codeword (i.e., 32 data bits plus six error correction bits). The addition of this parity bit makes the SEC/DED codeword 39 bits in length (seven bits of which are the error code). The SEC/DED code maps each of the $2^{32}$ possible data values into a space containing $2^{39}$ symbols so that each data value has 40 closely-related symbols. One of these 40 is the error-free bit pattern representing that data value. The others are the 39 symbols that are Hamming-distance-one from the error-free bit pattern.

To use this code for error-correction, each 32-bit data word must be encoded in the 39-bit SEC/DED code. In a Hamming SEC/DED code, the 39-bit codeword would be formed by appending seven additional bits to the original 32-bit data value. The seven additional bits are determined by applying parity functions over various combinations of the 32 data bits. Computer hardware first computes the 7-bit error code pattern from the 32 data bits, and then stores these seven bits in a tag field associated with the data word. When the computer later reads a data word, it checks for errors by computing an error "syndrome" for the word. In the case of a Hamming SEC/DED code, the syndrome is formed by recomputing the 7-bit pattern from the 32 data bits and then exclusive-ORing this with the pattern that was previously computed and stored in the tag field.

Figure 5:
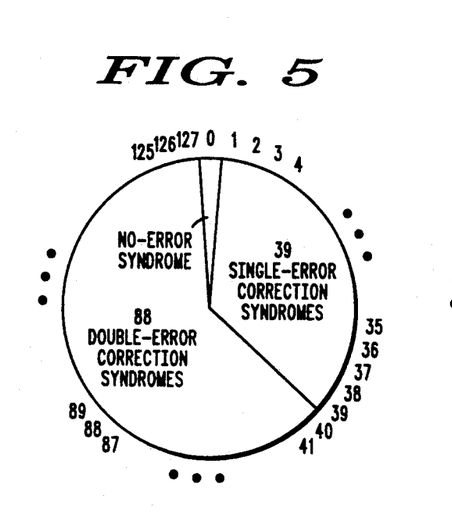
In FIG. 5, there are shown a representation of 128 values of seven-bit error syndrome allocated between no error syndrome, single-error correction syndromes, and double error detection syndromes.

In FIG. 5, the 128 values of the seven-bit error syndrome ($2^7=128$ symbols) are depicted on a wheel. Of the 128 symbols, 40 are in use for the error correction process and 88 are used for error detection. One of the 40 is the syndrome indicating no error, and the other 39 of the 40 are syndromes indicating that one particular bit is in error. The remaining 88 syndromes are all equivalent from the viewpoint of the error correction/detection hardware. All 88 indicate that a multiple-bit (hence uncorrectable) error has occurred. Since only one code would be needed to indicate that an uncorrectable error has occurred, 87 of the 88 codes represent unused information storage capacity that can be used to distinguish legal from illegal data access.

When the SEC/DED hardware detects a no-error syndrome, it allows the read operation to continue as normal. When the hardware detects one of the 39 single-error correction syndromes, it corrects the error by inverting the appropriate codeword bit and then allows the read operation to continue. If the hardware detects any of the 88 double-error syndromes, it does not have enough information to make a correction so it generates a bus-error interrupt. The system described in this disclosure makes use of this behavior to enforce object reuse security, as discussed below.

The method and apparatus for combined error detection/correction and object reuse protection requires some hardware in addition to the SEC/DED hardware. The required hardware modifies the syndrome value read from memory so that an attempt to read a previous user's data is treated as an uncorrectable error, i.e., the read operation is aborted by generating an interrupt, halting the clock, or removing power.

Error detection/correction is normally implemented by representing information in a code that incorporates a certain amount of extra information. This extra information occupies data storage space, so the error detection/correction mechanism requires additional storage hardware. As a matter of practicality, the hardware usually provides more storage capacity than is required by the error detection/correction code. The system described here uses the extra storage capacity to provide object reuse protection.

As an implementation example, for a SEC/DED code used with a paged RAM, the following hardware is required for the error correction/detection mechanism before the object reuse protection is incorporated:
(1) a SEC/DED tag field on each memory word,
(2) a SEC/DED generator,
(3) a SEC/DED checker, and
(4) some miscellaneous "glue" logic.

Figure 6:
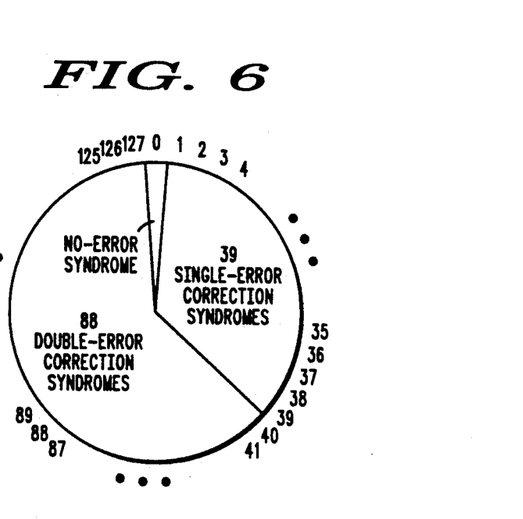
In FIG. 6, there is shown a representation of a zero bias to the seven-bit single-error-correction/double-error-detection (SEC/DED) code.

As shown in FIG. 6, the hardware can modify the syndrome value by applying a "bias", so that the SEC/DED hardware makes a different interpretation of the syndrome patterns for each successive user of a particular memory area. Assume, for example, that the SEC/DED hardware interprets a syndrome of "0" as meaning that no error has occurred, interprets syndromes "1" through "39" as meaning that a single correctable error has occurred, and interprets syndromes "40" through "127" as meaning that an uncorrectable multiple-bit error has occurred. Further assume that the bias is in the form of an integer value added modulo 128 to the syndrome. In FIG. 6, the object reuse protection hardware has applied a bias of zero so that the SEC/DED hardware makes its normal interpretation of the syndrome patterns.

Figures 7, 8, 9:
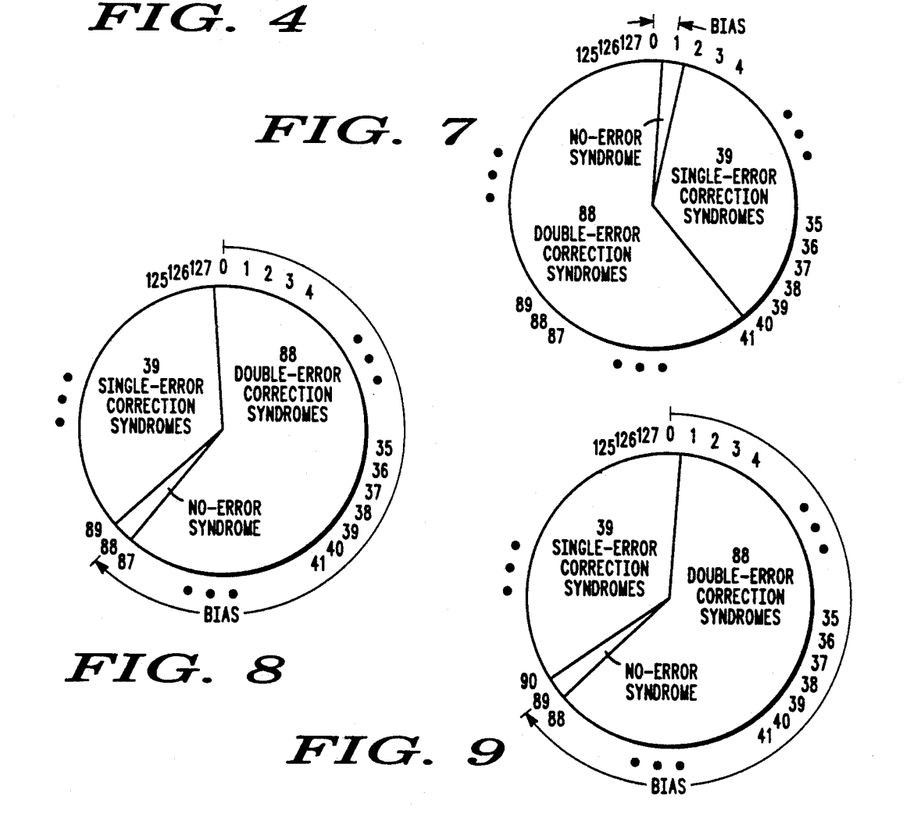
In FIG. 7, there is shown a representation of a bias of one to the seven-bit SEC/DED code.
In FIG. 8, there is shown a representation of a bias of 88 to the seven-bit SEC/DED code.
In FIG. 9, there is shown a representation of a bias of 89 to the seven-bit SEC/DED code.

In FIG. 7, the object reuse protection hardware has applied a bias of one so that the SEC/DED hardware's interpretation of the syndrome patterns is shifted by one. That is, syndrome "1" is interpreted as meaning "no error", syndromes "2" through "40" are interpreted as single-bit errors, and syndromes "41" through "127" and "0" are interpreted as uncorrectable errors.

In this example, the biased syndrome value equals the modulo 128 addition of the bias to the unbiased syndrome value.

In FIG. 8, the object reuse protection hardware has applied a bias of 88 so that the SEC/DED hardware's interpretation of the syndromes is shifted by 88 patterns. This is the maximum amount that the syndromes can be "safely" biased in this example.

If the syndromes were biased one additional position, as shown in FIG. 9, the syndrome "0" would be interpreted by the SEC/DED hardware as a correctable error. As a result, data that was written while the bias was 0 could now be read by the new "bias-89" user of the memory area. Even though the hardware would apply an erroneous "correction" to one of the 39 codeword bits, at least 31 of the original data bits would be available to the new user (although the user may not know which, if any, of the data bits was incorrect). If the error-correction code field can be read by the user, the user can reverse the single error correction to recover the thirty-second data bit.

The error detection/correction combined with object reuse protection method and apparatus disclosed here causes an attempted illegal access to be treated as an uncorrectable error, thereby preventing access by causing an interrupt or by halting processing. Part of the small amount of additional hardware required by this system is the hardware that differentiates a legal access from an illegal access. The remainder of the additional hardware forces an illegal access to be treated as an uncorrectable error. The details of this hardware are dependent upon the specific fault detection/correction code and upon the particular storage access method. An example implementation will be described for a SEC/DED code used with a paged random access memory (RAM).

Figure 10:
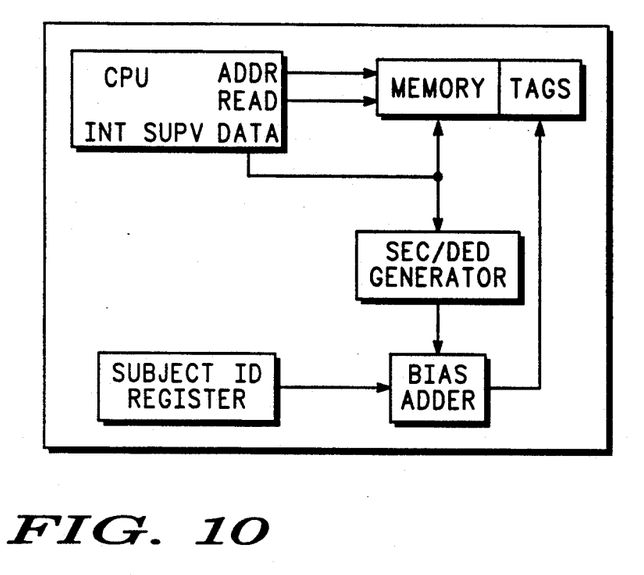
In FIG. 10, there is shown a representation of biasing the SEC/DED during write operations.

FIG. 10 illustrates the error detection/correction combined with object reuse protection apparatus during a write operation. The apparatus includes a CPU, memory with a tag field corresponding to each memory word location, subject ID register, SEC/DED generator, and bias adder. The CPU is coupled to the memory and the SEC/DED generator. The SEC/DED generator is coupled to the bias adder. The subject ID register is coupled to the bias adder and the bias adder is coupled to the memory.

During a write operation to memory, as shown in FIG. 10, the SEC/DED generator generates an error correction/detection code pattern that is based upon the data to be written into memory. The code is then stored in the tag associated with appropriate memory location, written by the CPU. When the system described is in use, this error correction/detection code pattern is modified by some bias value (possibly using modulo addition) representing the current subject as represented by the subject ID register. The biasing function is accomplished in the bias adder. Each time that a memory area is assigned to a different subject (user or process), the bias value is changed. Changing the bias gives each subject a unique "signature". If a subject attempts to read data that has another subject's signature, the hardware will halt the read operation, thus ensuring object reuse security.

Figure 11:
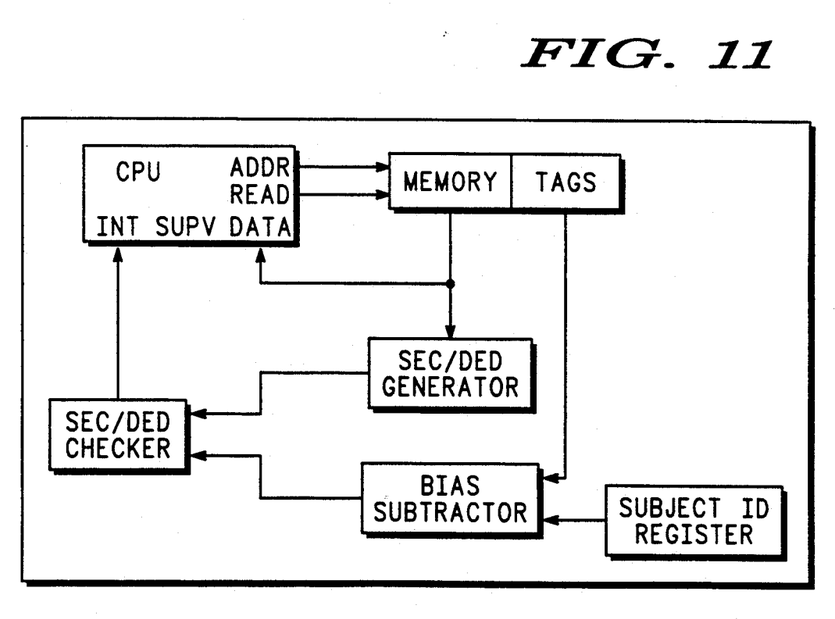
In FIG. 11, there is shown a representation of removing the bias during read operations.

FIG. 11 illustrates the error detection/correction combined with object reuse protection apparatus during a read operation. The apparatus includes a CPU, memory with a tag field corresponding to each memory word location, subject ID register, SEC/DED generator, bias subtractor, and SEC/DED checker. The CPU is coupled to the memory and the SEC/DED checker. The SEC/DED generator is coupled to the memory and to the SEC/DED checker. The subject ID register is coupled to the bias subtractor. The bias subtractor is coupled to the memory and to the SEC/DED checker.

During a read operation, as shown in FIG. 11, the SEC/DED checker determines whether or not an error has occurred. This is done by computing the error syndrome based upon the value read from the error code tag field and the value read from the data field. If the syndrome indicates no error, the read operation continues as normal. If a single-bit error is indicated, the hardware corrects the error and allows the operation to continue. If a multiple-bit error is indicated, the read operation is aborted through an error signal, non-maskable interrupt (NMI), bus error, or reset. The system reverses the previously applied bias to the tag field and the syndrome so that an attempt to read data that was written with a different bias is treated as an uncorrectable error. When a word is read, the current value in the syndrome bias register is subtracted from the word's error tag before the tag value and the recomputed error code are sent to the SEC/DED syndrome checker. The effect of these additions and subtractions is to "bias" the tag by the value in the subject ID register.

Each time the page is reassigned to a different process (or to a different instantiation of the same process) the syndrome bias value is changed. The value in the subject ID register is changed every time that the operating system schedules a different process to run. Because each subject has a different ID number, when a memory area is reassigned to a different subject, the syndrome bias value will be different. If memory areas are initially cleared using a bias value of zero and then are assigned to subjects only in increasing order of subject IDs, the bias amount subtracted will always be greater than or equal to the bias value that was in effect when the memory word was last written. Thus, if the current user of the memory area attempts to read data that was written by a previous user, the bias additions and subtractions will yield a net negative bias, i.e., counterclockwise from the no-error syndrome on the wheel shown in FIG. 5. If bias values are always limited to numbers in the "safe" range (i.e., 0 to the number of double error detection syndromes), this net negative bias will always yield a syndrome in the double error detection range. As a result, a word written by a previous user with no errors will be read by the current user as an uncorrectable error. The SEC/DED hardware will detect this and abort the read operation, thereby preventing a breach of object reuse security. Note that the value in the subject ID register can only be changed when the CPU is executing in the reference monitor domain (i.e., in supervisor mode on many CPUs). The operating system can thus change the current subject ID when necessary, e.g., when switching to a different process or when transferring messages between processes.

Thus, in general, when the operating system schedules a particular $Process_m$ to run, the operating system writes a bias value of m into the syndrome bias register so that the SEC/DED error syndromes will be interpreted as meaning "no error". If $Process_m$ asks for a page of memory, the operating system, running in reference monitor domain, picks a page of memory from its pool that was last used by a process with an ID number less than "m" and allocates this page to $Process_m$. Each time that $Process_m$ writes into a word of this page, the word's SEC/DED tag is changed to "m" (assuming an error-free write operation).

If Process$_m$ attempts to read a word from the page that was last written by Process$_k$, the word's error syndrome will be (k-m) modulo $2^c$ (where k is between 0 and m, inclusive, and c is the number of error code bits), which will be interpreted as a double-bit error, and the SEC/DED hardware will generate a bus error interrupt. But if a single bit error has actually occurred, the word's error syndrome will be (k−m+x) modulo $2^c$ (where x is the number of the bit that is in error), which will be interpreted as a double bit error, a single bit error in a bit other than bit x, or as no error. If the syndrome is interpreted as a double bit error, the hardware will generate a bus error interrupt and Process$_m$ will be prevented from reading the word. If the syndrome is interpreted as a single bit error, the hardware will "correct" the wrong bit but allow Process$_m$ to read the word. Process$_m$ will also be permitted to read the word if the syndrome is interpreted as no error. However, this is an extremely low probability event since most words do not have errors, and as soon as Process$_m$ reads a word with no errors but with the wrong bias, the hardware will generate an interrupt to the operating system and Process$_m$ will be terminated. Thus, Process$_m$ is effectively prevented from reading any residual data in the page, thereby enforcing the object reuse security policy.

When Process$_m$ is finished with the page, it returns it to the operating system. Without the syndrome bias mechanism, at this point the operating system would be forced to overwrite the page to ensure no residual data remains before reallocating the page to another process. With the syndrome bias mechanism, the operating system can simply change the bias value. For instance, the operating system may change the bias register value to "n" (with n>m) and reallocate the page to Process$_n$. Whenever Process$_n$ attempts to read a word from the page that it has not previously written, a bus error interrupt will be generated because the tag will be interpreted as indicating a "double-bit" error. The operating system can continue reallocating this page without overwriting until the bias value reaches "89". At that point the syndrome wheel rotates too far, allowing a word originally written with a no-error syndrome pattern of "0" to be interpreted as a "bias 89" syndrome indicating a single error correction. A process executing with a bias of 89 could therefore recover 31 of the 32 data bits directly, and would know which of the 32 bits to invert to recover the thirty-second data bit. To prevent such a recovery, the operating system must overwrite the page when the bias value exceeds 88.

Using SEC/DED coding to provide object reuse protection does have a potential drawback. Once a page has been modified by a process, it can no longer be made accessible to a previous owner of the page. (Previous page owner access is permissible for object reuse tags that are not combined with SEC/DED codes, however.) The reason is that data written by a later owner of the page will still be partially accessible to an earlier owner of the page. When the earlier owner reads data written by a later owner, the SEC/DED hardware will interpret the tag as indicating a single-bit error. The hardware will "correct" this bit, even though no bit was actually in error. This will allow the earlier owner to read all but one of the bits correctly, and one bit inverted. If the earlier owner can read the tag, or knows how many times the page has been reassigned since he first owned it, then the earlier owner can identify and correct the last remaining bit.

In the implementation of the error detection/correction and object reuse protection method and apparatus described, a different bias value is associated with each subject. Each memory area must be reused in increasing order of subject IDs.

An alternate embodiment of the error detection/correction and object reuse protection method and apparatus can eliminate this drawback by associating a different bias value with each memory area. The syndrome bias value used with each segment or page is incorporated into the segment's or page's descriptor. A process can access multiple segments or pages, each with a different bias value. In the alternative embodiment, any page or segment can be reassigned to any subject. Each time that the memory area is reassigned, the bias value in its descriptor is incremented. The bias value must still be incremented even if the page or segment is returned to a previous owner if the memory area has since has another owner. When the page is completely overwritten, the bias value is reset to zero.

Thus, there is a certain amount of unused encoding capacity in most error-correction encodings which can be used to deny the new user of a recycled storage object access to data that was written into the object by a previous user. This usage of the extra capacity does not deter from the error detection/error correction functionality. Many variations and extensions of the proposed mechanism are possible. The system can be applied to register files, cache memories, random access main memories, magnetic or optical recording disk or tape storage, or any other data recording medium. The mechanism utilizes an n-bit error correction/detection tag on each data record that may be separately accessed. For a disk or tape storage device, this would be a "record". For a random access memory, this would be a "memory word". While described above as implemented for a random-access main memory, it should be understood that the essence of the system is equally applicable to any data storage medium using any access discipline.

Note that, although the system has been described as implemented with a Hamming code, other error detecting and correcting codes are possible. The simplest case is that of a one-bit parity code. One subject could use even parity while another uses odd parity. In a somewhat more complex implementation, the odd/even parity indicator would be stored in the segment or page descriptor. Even these very simple implementations may be very useful, particularly in situations in which only two subjects have access to the same memory area. More elaborate implementations are possible based on other types of codes such as linear codes, polynomial codes, cyclic codes, BCH codes, convolutional codes, and arithmetic codes. Techniques for biasing the syndrome other than addition are also possible. For instance, the syndrome might be exclusive-ORed with a polynomial counter. The key, regardless of the code used, is the modification of the error tag value so that the data is error-free when read back by the writer, but interpreted as an uncorrectable error when read by some other subject.

Note, also, that other memory sizes and error code sizes beside 32-bit and 7-bit configurations, respectively, may be used with the method and apparatus disclosed. In fact, the technique becomes still more efficient with larger word sizes. With a 64-bit word and an 8-bit tag, pages may be reassigned 183 times before they must be overwritten. With a 128-bit word and a 9-bit tag, the number of times pages may be reassigned increases to 374. For a 256-bit word and a 10-bit tag, the number increases to 757.

The error detection/correction and object reuse protection method and apparatus described can be used in mainframe computers, minicomputers, microcomputers, computer workstations and embedded communications equipment to provide object reuse protection and error correction/detection in an efficient manner. This is important in any computer system that should provide accurate computing and privacy/segurity. The performance improvement provided by this system is particularly significant for communications equipment, which tends to reassign memory buffers frequently.

The system can be used in computer systems that are intended to provide data security. It is especially appropriate in systems that require some measure of fault detection or fault tolerance. The system solves the object reuse problem in an efficient manner by combining object reuse protection with error-detection or error-correction codes. The mechanism can be incorporated into systems using any off-the-shelf CPU by using some additional hardware to drive the CPU's bus error, non-maskable interrupt, or reset input, or for CPUs lacking these inputs, by stopping the clock or by removing power. This mechanism combines error detection/correction with object reuse protection, so that both features are provided for nearly the same cost as providing either of the two features alone.

What is claimed is:

1. A method for combined error detection/correction and object reuse protection in a computer, the method comprising the steps of:
   computing an original error detection/correction code associated with a data word;
   applying a first forward bias to the original error detection/correction code to create a first forward-biased error detection/correction code when a first subject writes the data word into a memory location;
   copying the first forward-biased error detection/correction code to a tag associated with the data word;
   applying a first reverse-bias to the first forward-biased error detection/correction code when the memory location is read by the first subject;
   permitting the first subject to read the data word with the first reverse-bias canceling the first forward-biased error detection/correction code;
   applying a second reverse-bias to the first-biased error detection/correction code to create a still-biased error detection/correction code when a second subject attempts to access the data word; and
   denying access to the data word if the still-biased error detection/correction code comprises an uncorrectable error.

2. A method for combined error detection/correction and object reuse protection as claimed in claim 1, wherein the step of denying access comprises the step of aborting a read operation.

3. A method for combined error detection/correction and object reuse protection as claimed in claim 1, wherein the step of applying a first forward-bias comprises the step of applying a first forward-bias to create a first forward-biased error detection/correction code based on a single-error-correction/double-error-detection (SEC/DED) Hamming code.

4. A method for combined error detection/correction and object reuse protection as claimed in claim 3, wherein the steps of applying a first reverse-bias and applying a second reverse-bias each comprise the step of applying a single-error-correction/double-error-detection (SEC/DED) Hamming code.

5. A method for combined error detection/correction and object reuse protection as claimed in claim 4, wherein the steps of applying a first forward-bias, applying a first reverse-bias, and applying a second reverse-bias each further comprise the step of computing an error syndrome for the data word.

6. A method for combined error detection/correction and object reuse protection as claimed in claim 5, wherein the step of computing an error syndrome comprises the steps of:
   computing a new error code pattern from the data word; and
   exclusive-ORing the new error code pattern from the data word with the tag.

7. In a computer, a device for providing combined error detection/correction and object reuse protection, the device comprising:
   a central processing unit (CPU);
   a memory means for storing a data word and a corresponding tag identifying a first process with a first identification (ID), the memory means coupled to the CPU;
   a subject ID register for storing a current process ID for a current process, the subject ID register coupled to the CPU and the memory means; and
   single-error-correction/double-error-detection (SEC/DED) means for determining errors in the data word, the SEC/DED means comprising:
   a SEC/DED generator for generating an error code pattern, the SEC/DED generator coupled to the CPU; and
   a bias adder for changing the error code pattern to a first forward-biased error code pattern based on the first ID when the data word is written into the memory, the bias adder coupled to the memory means, to the subject ID register, and to the SEC/DED generator.

8. In a computer, a device for providing combined error detection/correction and object reuse protection as claimed in claim 7, wherein the SEC/DED means further comprises a bias subtractor for subtracting a second reverse-bias from the first forward-biased error code pattern to create a still-biased error code pattern, the second reverse-bias based on a second subject identification (ID) from a second subject accessing the data word from the memory, the bias subtractor coupled to the memory means and to the subject ID register.

9. In a computer, a device for providing combined error detection/correction and object reuse protection as claimed in claim 8, wherein the SEC/DED means further comprises a SEC/DED checker for aborting the accessing if the twice-biased error code pattern is read as an uncorrectable error, the SEC/DED checker coupled to the CPU, to the SEC/DED generator, and to the bias subtractor.

10. A device for providing combined error detection/correction and object reuse protection, the device comprising:
    a central processing unit (CPU);

a memory means for storing a data word and a corresponding tag identifying a first process with a first identification (ID), the memory means coupled to the CPU;

a subject ID register for storing a current process ID for a current process, the subject ID register coupled to the CPU and the memory means; and single-error-correction/double-error-detection (SEC/DED) means for determining errors in the data word, the SEC/DED means comprising:

a SEC/DED generator for generating an error code pattern, the SEC/DED generator coupled to the CPU; and a bias adder for changing the error code pattern to a first biased error code pattern based on the first ID when the data word is written into the memory, the bias adder coupled to the memory means, to the subject ID register, and to the SEC/DED generator.

11. A device for providing combined error detection/correction and object reuse protection as claimed in claim 10, wherein the SEC/DED means further comprises a bias subtractor for subtracting a second bias from the first biased error code pattern to create a twice-biased error code pattern, the second bias based on a second subject identification (ID) associated with a second subject accessing the data word from the memory, the bias subtractor coupled to the memory means and to the subject ID register.

12. A device for providing combined error detection/correction and object reuse protection as claimed in claim 11, wherein the SEC/DED means further comprises a SEC/DED checker for aborting the accessing if the twice-biased error code pattern is read as an uncorrectable error, the SEC/DED checker coupled to the CPU, to the SEC/DED generator, and to the bias subtractor.

13. A method for providing error detection/correction and prevention of unauthorized access to data using memory tags, the method comprising the steps of:

computing an original error detection/correction code associated with a data word;

applying a first bias to the original error detection/correction code to create a first-biased error detection/correction code when the memory is assigned to a first subject;

copying the first-biased error detection/correction code to a tag associated with the fata word when the first subject writes the data word into a memory location;

applying a second bias to the first-biased error detection/correction code to create a twice-biased error detection/correction code when a second subject attempts to access the data word; and denying access to the data word if the twice-biased error detection/correction code comprises an uncorrectable error.

14. A method for providing error detection/correction and prevention of unauthorized access to data using memory tags as claimed in claim 13, wherein the step of denying access comprises the step of aborting a read operation.

15. A method for providing error detection/correction and prevention of unauthorized access to data using memory tags as claimed in claim 13, wherein the step of applying a first bias to the original error detection/correction code comprises the step of applying a first bias to the original error detection/correction code based on a single-error-correction/double-error-detection (SEC/DED) Hamming code.

16. A method for providing error detection/correction and prevention of unauthorized access to data using memory tags as claimed in claim 13, wherein the step of applying a second bias to the original error detection/correction code comprises the step of applying a second bias to the original error detection/correction code based on a single-error-correction/double-error-detection (SEC/DED) Hamming code.

* * * * *